Sept. 21, 1926.
W. A. HEARN
SECTIONAL ROD HANDLE
Filed Nov. 13, 1925
1,600,669
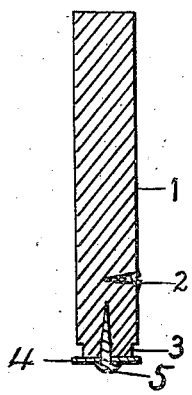
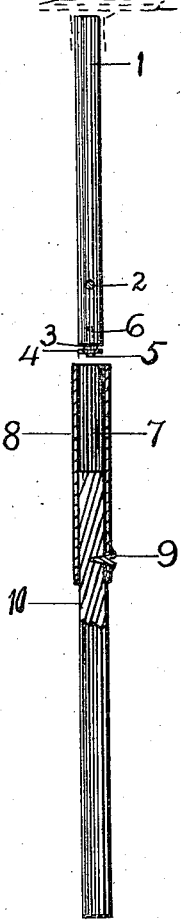

Patented Sept. 21, 1926.

1,600,669

UNITED STATES PATENT OFFICE.

WALTER A. HEARN, OF BALTIMORE, MARYLAND.

SECTIONAL-ROD HANDLE.

Application filed November 13, 1925. Serial No. 68,928.

My invention relates to sectional-rod-handles such as long handles used for sundry devices such as being attached to squeegees, mops, wall brushes, white-wash brushes, vacuum tools, etc., so as to make such long handles in sections whereby they can be conveniently carried and assembled where they are to be used.

The objects of my invention are—

1st. To provide a new article of manufacture.

2nd. To provide a new sectional-rod handle that can be conveniently carried and assembled and disassembled.

3rd. To provide a joint for sectional-rod-handles with a simple way to assemble the parts, and frictionally secure them together.

4th. To provide a simple way to adjust the tension where the parts are frictionally held together.

5th. To provide a screw for adjusting the tension of the frictionally held section.

6th. To provide a washer at the end of the frictionally held section whereby the atmospheric pressure will assist in securing the sections together.

These objects I accomplish by the method of construction and assembling of the sections.

Referring to the drawings,—

Fig. 1 is a side elevation of my improved sectional-rod-handle illustrating a sectional view of the joint between the sections.

Fig. 2 is a sectional view of a lengthwise section of my improved sectional-rod-handle.

The numeral 1 designates the detachable part of my sectional-rod-handle in which at a convenient place is screwed the adjusting screw 2, and at the end is a boss 3 and a flexible washer 4 held onto the end of the said detachable section 1 by the screw 6 screwed into the end of the said sectional part 1 and provided with a head 5.

Onto the opposite end of this detachable section 1 may be attached a squeegee 12 indicated by dotted lines, or a scraper, or a brush, or a mop, etc. This sectional part 1 is assembled to the other part of my sectional-rod-handle by forcing it with its washer 4 and its tension screw 2 into the socket 7 of the tubular joint 8 which is fixedly held onto the sectional part 10, but may be detached by removing the screw 9 which passes through the tubular joint 8 and into the section 10.

It will be seen that forcing the detachable section 1 into the tubular joint 8 will cause the air in the socket 7 to escape and then the atmospheric pressure on the outside of the detachable section 1 will help to hold the detachable section 1 in the joint 8; the tension screw head 2 will press against the inner wall of the socket 7 of the said tubular joint 8 and thereby increase the friction of the outer wall of the detachable sectional part 1 against the inner wall 7 of the said tubular joint 8; and it is readily seen that by slightly unscrewing the tension screw 2 this friction may be increased at will to meet the requirements of the tool attached to the end of the detachable section 1.

I am aware that sectional rods have been used for various purposes heretofore, but no simple device as a single screw has been used heretofore to maintain the friction necessary to secure the parts of a sectional joint together.

The detachable sectional part 1 has a sliding fit into the socket 7 of the tubular joint 8.

What I claim is—

1. A sectional-rod-handle comprising a rod and a tubular socket secured thereto, the socket portion extending past the end of the said rod, and a detachable section of the rod provided with an adjustable screw for sliding within the said socket.

2. A sectional-rod-handle comprising a rod and a tubular socket detachably secured thereto, the socket portion extending past the end of the said rod, and a detachable section of said rod provided with a washer for engaging the inner wall of said socket to make the said detachable section and said socket substantially air-tight.

3. A sectional-rod-handle comprising a rod and a tubular socket detachably secured thereto, the socket portion extending past the end of the said rod, and a detachable section of the rod provided with a screw in its side and also a washer, said screw and washer for engaging the inner wall of said socket said detachable section and washer being substantially air-tight in said socket.

WALTER A. HEARN.